(12) United States Patent
Zebuhr

(10) Patent No.: US 6,846,387 B1
(45) Date of Patent: Jan. 25, 2005

(54) ROTATING FLUID EVAPORATOR AND CONDENSER

(75) Inventor: William H. Zebuhr, Nashua, NH (US)

(73) Assignee: Ovation Products Corporation, Nashua, NH (US)

(*) Notice: Subject to any disclaimer, the term of this patent is extended or adjusted under 35 U.S.C. 154(b) by 667 days.

(21) Appl. No.: 09/609,881

(22) Filed: Jul. 5, 2000

(51) Int. Cl.[7] .............................. B01D 1/22; B01D 1/28; B01D 3/28

(52) U.S. Cl. ..................... 202/172; 159/6.1; 159/15; 159/18; 159/24.1; 159/28.6; 165/88; 165/115; 165/167; 202/182; 202/186; 202/238

(58) Field of Search ................ 202/238, 172–174, 202/182, 186, 236, 185.1; 159/6.1, 18, 24.1, 43.1, 28.6, DIG. 8, 14–15, 17.1; 165/165–167, 88, 115; 203/24

(56) References Cited

U.S. PATENT DOCUMENTS

| | | |
|---|---|---|
| 2,703,310 A | 3/1955 | Kretchmar |
| 2,894,879 A | 7/1959 | Hickman |
| 2,899,366 A | 8/1959 | Hickman |
| 2,953,110 A | 9/1960 | Etheridge ............... 29/890.03 |
| 3,310,105 A | 3/1967 | Butt ........................ 165/166 |
| 3,568,766 A * | 3/1971 | Thomas .................... 165/181 |
| 3,764,483 A | 10/1973 | Tleimat |
| 3,840,070 A | 10/1974 | Becker et al. ............ 165/167 |
| 3,890,205 A | 6/1975 | Shnitzer |
| 4,125,946 A | 11/1978 | Prager |
| 4,129,014 A | 12/1978 | Chubb |
| 4,235,679 A | 11/1980 | Swaidan |
| 4,267,021 A | 5/1981 | Speros et al. |
| 4,402,793 A | 9/1983 | Petrek et al. |
| 4,504,361 A | 3/1985 | Tkac et al. |
| 4,585,523 A | 4/1986 | Giddings |
| 4,586,985 A | 5/1986 | Ciocca et al. |
| 4,671,856 A | 6/1987 | Sears |
| 4,707,220 A | 11/1987 | Feres |
| 4,731,159 A | 3/1988 | Porter et al. ............. 159/6.1 |
| 4,822,455 A * | 4/1989 | Olrik ........................ 202/236 |
| 5,045,155 A | 9/1991 | Ramsland |
| 5,232,557 A | 8/1993 | Kontu et al. ............. 202/182 |
| 5,409,576 A | 4/1995 | Tleimat |
| 5,411,640 A | 5/1995 | Ramsland |
| 5,628,879 A | 5/1997 | Woodruff |
| 5,810,975 A | 9/1998 | Bourdel |
| 5,927,383 A * | 7/1999 | Ramm-Schmidt et al. .... 165/46 |
| 5,968,321 A | 10/1999 | Sears ....................... 202/172 |
| 6,238,524 B1 | 5/2001 | Zebuhr .................... 202/185.1 |
| 6,261,419 B1 | 7/2001 | Zebuhr .................... 202/172 |

FOREIGN PATENT DOCUMENTS

| | | |
|---|---|---|
| GB | 757 085 A | 9/1956 |
| GB | 757085 | 9/1956 |
| WO | WO 00 35551 A | 6/2000 |
| WO | WO 00 35552 A | 6/2000 |

OTHER PUBLICATIONS

Patent Cooperation Treaty PCT International Search Report, Form PCT/ISA/210, (Jul. 1998).

PCT Notification of Transmittal of The International Search Report of The Declaration, Form PCT/ISA/220, (Jul. 1998).

* cited by examiner

*Primary Examiner*—Virginia Manoharan
(74) *Attorney, Agent, or Firm*—Foley Hoag LLP

(57) ABSTRACT

An evaporator and condenser unit for use in distilling a liquid, such as water, includes a rotary heat exchanger plate having a plurality of accordion-style folds, and having its two ends joined together so as to give the folded plate a generally circular form. The adjacent panels of the folded plate define spaces between their oppositely facing surfaces, and these spaces are alternatingly configured as evaporating and condensing chambers. The evaporating chambers have their inner edges sealed by corresponding folds, while the condensing chambers have their outer edges sealed by corresponding folds. The folded plate is disposed between first and second end plates, and is mounted for rotation about its axis in a housing having a sump containing the liquid to be distilled. Liquid is supplied to the evaporating chambers and compressed vapor is supplied to the condensing chambers. Condensate is removed from the condensing chambers.

27 Claims, 6 Drawing Sheets

ROTATING FLUID EVAPORATOR AND CONDENSER

CROSS-RELATED APPLICATIONS

This application is related to the following co-pending U.S. patent applications:

U.S. patent application Ser. No. 09/211,363, now U.S. Pat. No. 6,238,524, entitled, ROTATING PLATE HEAT EXCHANGER, filed Dec. 14, 1998, and assigned to the assignee of the present application; and U.S. patent application Ser. No. 09/246,354, now U.S. Pat. No. 6,261,419, entitled, ROTATING PLATE HEAT EXCHANGER, filed Feb. 8, 1999, and assigned to the assignee of the present application.

BACKGROUND OF THE INVENTION

1. Field of the Invention

This invention relates to distillation systems and, more specifically, to an improved, highly efficient, rotary evaporator and condenser for use in a vapor compression distiller.

2. Background Information

Distillation is a well-known method for generating potable water from otherwise unsafe water sources (such as sea water or polluted ground water). With distillation, water is heated to boiling, and the resultant vapor (i.e. steam) is collected and condensed, producing distilled water. Many contaminants that are present in the water source are left behind when the water is converted to its vapor phase. Conventional small distillers typically incorporate and electric heating element to boil water in a tank. A condensing coil mounted above the tank collects the vapor and condenses it. The distilled water is then transferred to a holding tank or cell. These boiler-type distillers require substantial amounts of electrical power to produce relatively little distilled water, and are thus highly inefficient for producing anything other than small amounts of distilled water. They are also extremely slow, often taking many hours to produce just a few gallons of distilled water. Accordingly, boiling-type distillers have not gained widespread acceptance or use.

In addition to boiler-type distillers, thin-film distillers have also been proposed. For example, U.S. Pat. No. 4,402,793 to Petrek et al. titled MULTIPLE EFFECT THIN FILM DISTILLATION SYSTEM AND PROCESS is directed to a solar-powered, thin film distiller. In the distiller of the '793 patent, a plurality of parallel, spaced-apart plates are arranged to face the sun. Water to be distilled is supplied to the tops of the plates and guided to run down the back face of each plate. Sunlight irradiating the first plate's front side heats the plate and causes a portion of the water running down the opposite side to evaporate. The vapor condenses along the front side of the next adjacent plate, transferring heat to the flow of water on its opposite side and so on. Condensate generated along the front sides of the plates is separately collected at the bottoms of the plates.

To improve the efficiency of thin-film distillers, rotary evaporators have also been designed. For example, U.S. Pat. No. 4,731,159 to Porter et al., entitled EVAPORATOR, is directed to a rotary type evaporator having a plurality of horizontally stacked annular plates that are disposed within a housing and mounted for rotation about a central shaft. The ends of alternating pairs of plates are sealed to define sealed spaces. Each sealed space includes two inner plate surfaces facing each other and two outer surfaces, each of which is opposite a respective inner surface. The sealed spaces, moreover, are interconnected by a series of orifices and washers disposed between adjacent outer plate surfaces. A liquid to be distilled is introduced into the stack of rotating annular plates and enters each of the sealed spaces through an inlet port. As the liquid enters the spaces, it flows along the opposing inner surfaces of the space. A condensable vapor is introduced into the housing and is thus free to flow around the outer surfaces of the plates. The vapor is not, however, able to enter the sealed spaces.

Since the liquid in the sealed spaces is at a lower temperature than the vapor, the vapor condenses along the outer surfaces of the plates. The condensate is thrown off of the rotating plates, collects inside the housing and is removed through an outlet port located in the bottom of the housing. Condensation of the vapor also transfers heat across the plates to the liquid, thereby causing a portion of the liquid in the sealed spaces to evaporate. The vapor exits the sealed spaces through the liquid inlet ports and is removed from the top of the housing. Any non-evaporated liquid remaining in the spaces flows upwardly along the sealed spaces through the corresponding orifice/washer arrangements and is also withdrawn from the top of the evaporator.

Although it may provide some advantages, the design of the '159 evaporator presents a substantial risk of contamination of the condensate by the liquid being evaporated, and is thus not suitable to generating potable distilled water. In other words, with the evaporator of the '159 patent, the unsafe water which is being distilled could mix with, and thus contaminate, the distillate. For example, a leak at any of the sealed spaces would allow liquid from the sealed space to enter the housing and mix with the distillate being collected therein. The likelihood of such an occurrence, moreover, is not insignificant due to the corrosive attributes of some water sources and the high number of orifices and washers required to provide fluid communication between the various sealed spaces of the evaporator of the '159 patent.

Rotary plate evaporators, such as the evaporator disclosed in the '159 patent, can also be relatively expensive to manufacture, in large part, due to the inefficient use of materials. In particular, the circular plates of rotary evaporators, such as the '159 evaporator, are typically punched out of a rectangular sheet of copper stock. This often produces a significant amount of "waste" copper (i.e., the remaining portions of the rectangular sheet). Although such waste copper can be sold as salvage, the salvage prices for copper are far lower than the original costs. Accordingly, this expense must be reflected in the ultimate price of the distiller.

Vapor compression distillers, which can be more efficient than conventional distillers, are also known. The underlying principle of vapor compression distillers is that, by raising the pressure of a vapor (e.g., steam), its saturation temperature also rises. In a vapor compression distiller, vapor produced in an evaporator is removed, compressed (raising its saturation temperature) and returned to the evaporator, where it condenses, producing a distillate. Furthermore, the heat of vaporization that is given off as the vapor (having a raised saturation temperature) condenses is used to heat (and thus evaporate) the liquid being distilled. Large-scale vapor compression distillers using powerful centrifugal compressors can produce hundreds of gallons of distilled water per hour. These distillers, however, do not scale well to smaller systems. For example, the operating costs associated with the centrifugal compressor make them impractical for installations that require only tens of gallons of distilled water a day. Thus, a need exists for a small-scale distillation system that can be economically produced and efficiently operated.

SUMMARY OF THE INVENTION

Briefly, the invention relates to an evaporator and condenser unit for use in distilling a liquid, such as water. The evaporator and condenser unit includes a rotary heat exchanger plate having a plurality of folds or pleats. In particular, the plate, which is preferably rectangular in its original form, is folded accordion-style and its two ends are joined together so as to provide a generally circular form having an open central space. Adjacent panels of the folded plate define spaces between their oppositely facing surfaces, and these spaces are alternatingly configured as evaporating and condensing chambers. The evaporating chambers, moreover, are defined between adjacent panels joined at an inner diameter fold, while the condensing chambers are defined between adjacent panels joined at an outer diameter fold. The evaporating chambers are thus sealed at their inner diameter ends and open at their outer diameter ends, while the condensing chambers are open at their inner diameter ends and sealed at their outer diameter ends. The folded, heat exchanger plate is disposed between first and second end plates to seal the respective chambers from each other, and is mounted for rotation about its axis in a housing having a sump containing the liquid to be distilled.

The first end plate includes a plurality of condensate collection ports that are in fluid communication with the condensing chambers. These condensate ports are proximate to the outer diameter ends of the respective condensing chambers. A stationary scoop tube extends into a condensate collection space located at the first end plate opposite the folded, heat exchanger plate. The second end plate includes a plurality of liquid distribution ports that are in fluid communication with the evaporating chambers. These liquid ports are proximate to the inner diameter ends of the respective evaporating chambers. A rotary scoop tube extends from the second end plate opposite the folded plate into the sump. A compressor is preferably mounted within the central space defined by the folded plate. A compressor inlet connects that portion of the housing in fluid communication with the evaporating chambers to the compressor. A compressor outlet connects the compressor to that portion of the housing in fluid communication with the condensing chambers.

In operation, the folded, accordion-shaped, heat exchanger plate is rotated about its axis, causing the rotary scoop tube to pick up liquid from the sump and deliver it to the liquid ports of the second end plate. From here, the liquid is pumped up the evaporating chambers at their inner diameter ends. Due to the rotation of the heat exchanger plate, liquid is accelerated and forced outwardly. The liquid flows along the oppositely facing surfaces of the adjacent panels of the evaporating chambers, and at least a portion of the liquid is evaporated. The vapor flows through the open outer diameter ends of the evaporating chambers and enters the housing. The vapor is drawn out of the housing through the inlet to the compressor. Any remaining, unevaporated liquid is flung off of the corresponding panel surfaces of the evaporating chambers, strikes the side wall of the housing and drops back down into the sump. Compressed vapor is delivered via the compressor outlet to the condensing chambers, where it condenses along the oppositely facing surfaces of the respective panels. Centrifugal force generated by the rotating plate forces the condensate to the outer diameter ends of the condensing chambers which are sealed. The condensate flows upwardly opposite the sump, through the condensate ports and into the condensate collection space. From the condensate collection space, condensate is withdrawn from the evaporator and condenser unit by the stationary scoop tube.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
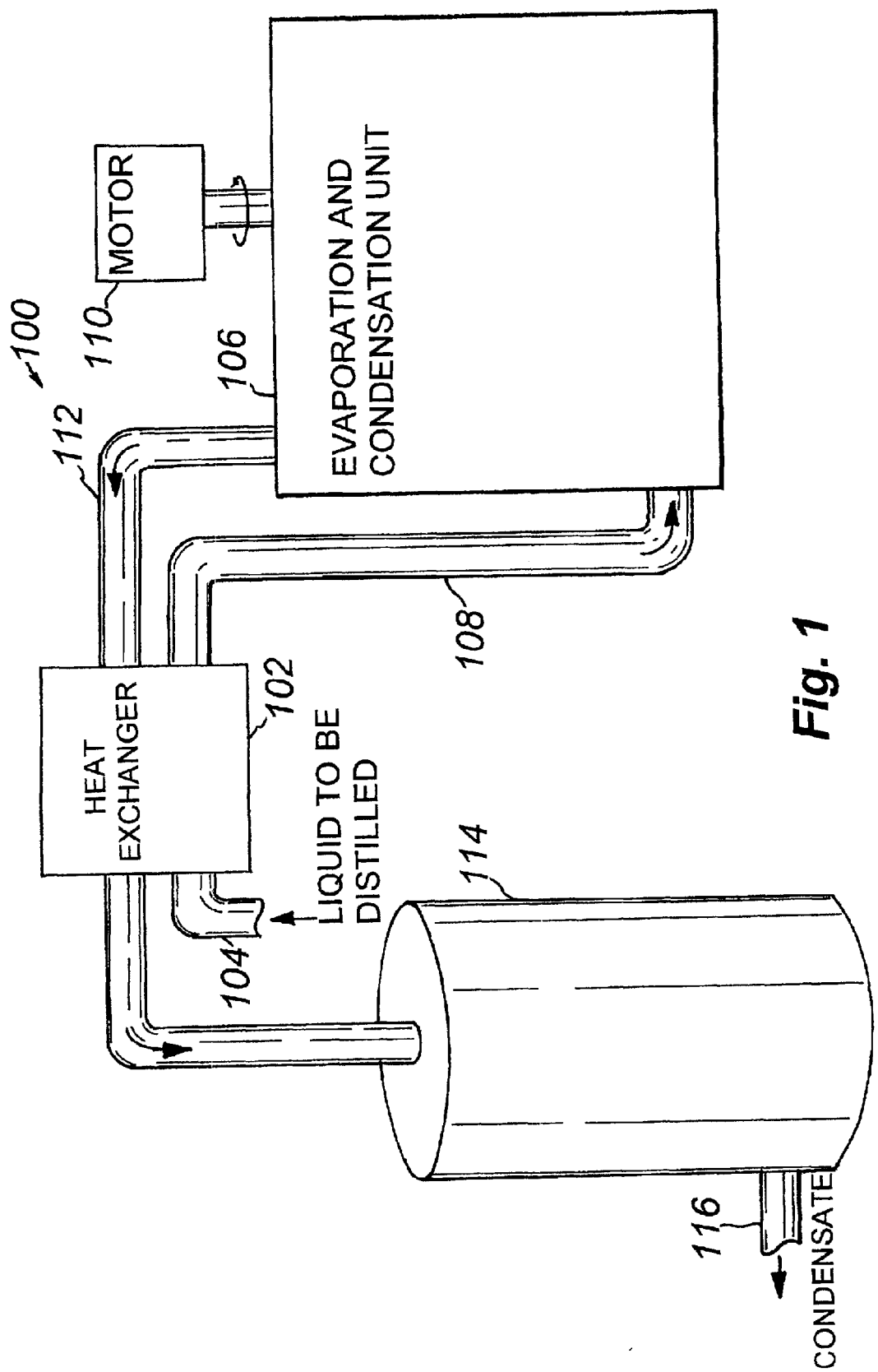
FIG. 1 is a highly schematic block diagram of a vapor compression distiller system in accordance with the present invention.

FIG. 1 is a schematic diagram of a vapor compression distillation system 100 in accordance with the present invention. Generally, the system 100 comprises a heat exchanger, such as counter-flow heat exchanger 102, for heating a supply of liquid to be distilled, such as non-potable water, which is received by heat exchanger 102 by first pipe 104. Heated liquid is transferred from the heat exchanger 102 to an evaporation and condensation unit 106 by a feed line 108. Coupled to the evaporation and condensation unit 106 is a motor 110 for supplying rotary power thereto. An output line 112 transfers a condensate, such as distilled water, from the evaporation and condensation unit 106 back through the heat exchanger 102. The condensate is then stored in a holding tank 114. Condensate may be withdrawn from the holding tank 114 by a second pipe 116.

Figure 2:
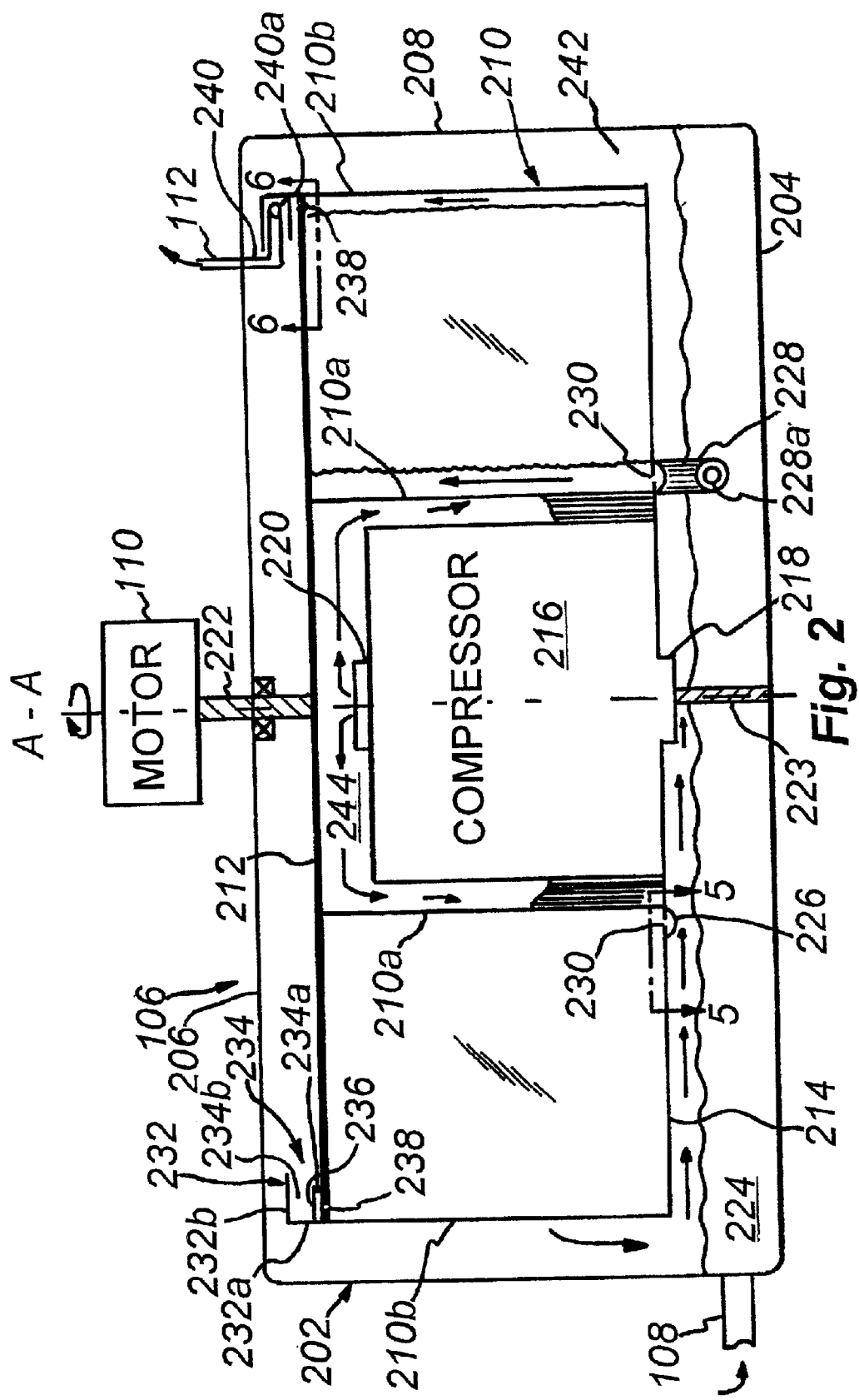
FIG. 2 is a cross-sectional, plan view of the evaporation and condensation unit and motor of FIG. 1.

FIG. 2 is a highly schematic, cross-sectional view the evaporation and condensation unit 106 and motor 110 of FIG. 1. The unit 106 includes a housing 202 having a bottom wall 204, a top wall 206 and a generally cylindrical side wall 208. Disposed within the housing 202 is a heat-exchanger plate 210, which, as described below, includes a plurality of folds or pleats that define alternating evaporating and condensing chambers. Plate 210 is configured for rotation about a central axis A—A, and includes an inner diameter edge 210a and an outer diameter edge 210b relative to axis A—A. Plate 210 is also mounted between a first end plate 212 and a second end plate 214 that are both substantially perpendicular to axis A—A. Disposed between the two end plates 212, 214 is a compressor 216 having an inlet 218 and an outlet 220. Compressor 216 may be mounted to end plates 212 and/or 214. As shown, the compressor inlet 218 preferably extends through the second end plate 214.

A drive shaft 222 extends from the motor 108, through the top wall 206 of the housing 202, and is attached to the first end plate 212 by suitable attachment means (not shown). Accordingly, motor 108 can rotate the combination of end plates 212, 214, heat exchanger plate 210 and compressor 214 about the central axis A—A. A stationary shaft 223 preferably extends from the bottom wall 204 of the housing 202 to the compressor 216. Stationary shaft 223, in cooperation with rotating shaft 222, provides a drive means for operation of the compressor 216. A sump 224, which receives a liquid to be distilled from feed line 106, is located within the housing 202 adjacent to the bottom wall 204.

It should be understood that motor 108 and/or compressor 216 may be located at other convenient locations. For example, compressor 216 may be disposed outside of the housing 202.

A circular liquid feed ring 226 is preferably mounted to the second end plate 214 opposite the heat exchanger plate 210. At least one rotating scoop tube 228 extends from the liquid feed ring 226 into the sump 224. The rotating scoop tube 228 has an opening 228a in the direction of rotation. Extending through the second end plate 214 are a plurality of liquid feed ports 230. As described below, these ports 230 provide fluid communication between the feed ring 226 and the evaporating chambers defined by the folded heat exchanger plate 210, and are located proximate to the plate's inner diameter edge 210a. A circular flange 232, having an L-shaped cross-section, is mounted to the first end plate 212 opposite the heat exchanger plate 210, proximate to the plate's outer diameter edge 210b. Flange 232 includes a first part 232a that is substantially perpendicular to first end plate 212 and a second part 232b that is parallel to and spaced from the first end plate 212 so as to define a condensate collection space 234 therebetween. A weir or dam 236 may also be disposed within the condensate collection space 234 substantially parallel to first end plate 212. The weir 236 divides space 234 into first and second spaces 234a, 234b.

Extending through the first end plate 212 are a plurality of condensate ports 238 that provide fluid communication between the condensing chambers defined by the folded heat exchanger plate 210 and the first condensate collection space 234a. A stationary scoop tube 240 extends through the top wall 206 of housing 202 and into the second condensate collection space 234b. Stationary scoop tube 240 has an opening 240a, which also preferably faces the direction of rotation of the beat exchanger plate 210. Scoop tube 240 is connected to the output line 112.

The folded heat exchanger plate 210, first end plate 212, and second end plate 214 collectively define two spaces within housing 202. An evaporated vapor space 242 generally consists of the space outboard of the outer diameter edge 210b of plate 210, above fist end plate 212 and below second end plate 214. The evaporated vapor space 242 is in fluid communication with the compressor inlet 218 and the evaporation chambers, as described below. A compressed vapor space 244 generally consists of the space inboard of the inner diameter edge 210a of plate 210, below first end plate 212 and above second end plate 214. The compressed vapor space 244 is in fluid communication with the compressor outlet 220 and the condensate chambers, as described below. The evaporated vapor space 242 and the compressed vapor space 244 are segregated (i.e., sealed) from each other, primarily by the heat exchanger plate 210 and first and second end plates 212, 214.

Figure 3:
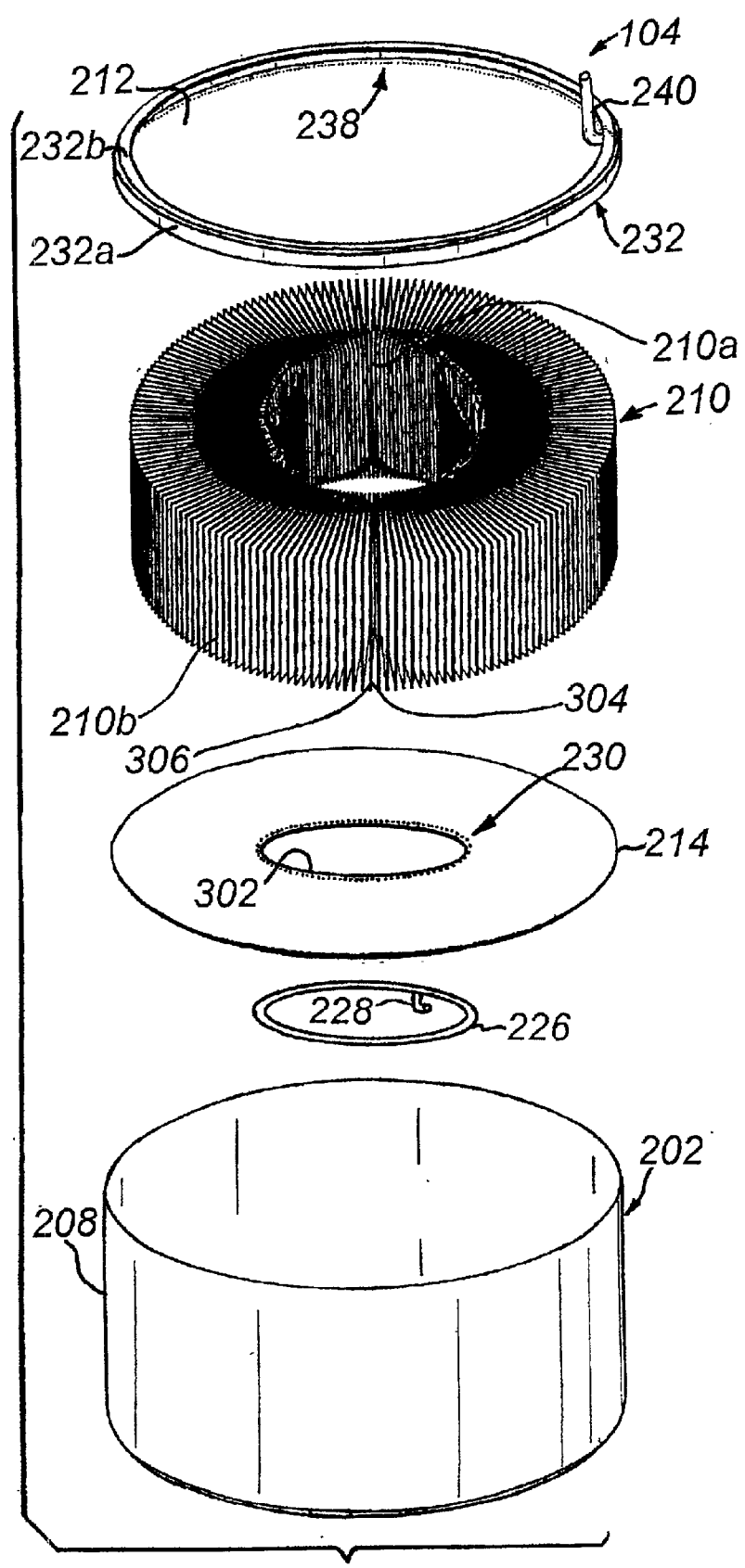
FIG. 3 is a partial, exploded view of the evaporation and condensation unit of FIG. 2.

FIG. 3 is a partial exploded view of the evaporation and condensation unit 106 of FIG. 2. The compressor 216 has been removed for clarity. As shown, the second end plate 214 includes an aperture 302, which is preferably sized to receive the compressor inlet 218 (FIG. 2). Disposed in a concentric circle or ring about aperture 302 are the liquid ports 230. The first end plate 212 is solid (i.e., no aperture) to prevent compressed vapor in the compressed vapor space 244 (FIG. 2) from flowing to the evaporated vapor space 242. The condensate ports 238 similarly form a concentric circle or ring about the first end plate 212.

Figure 4:
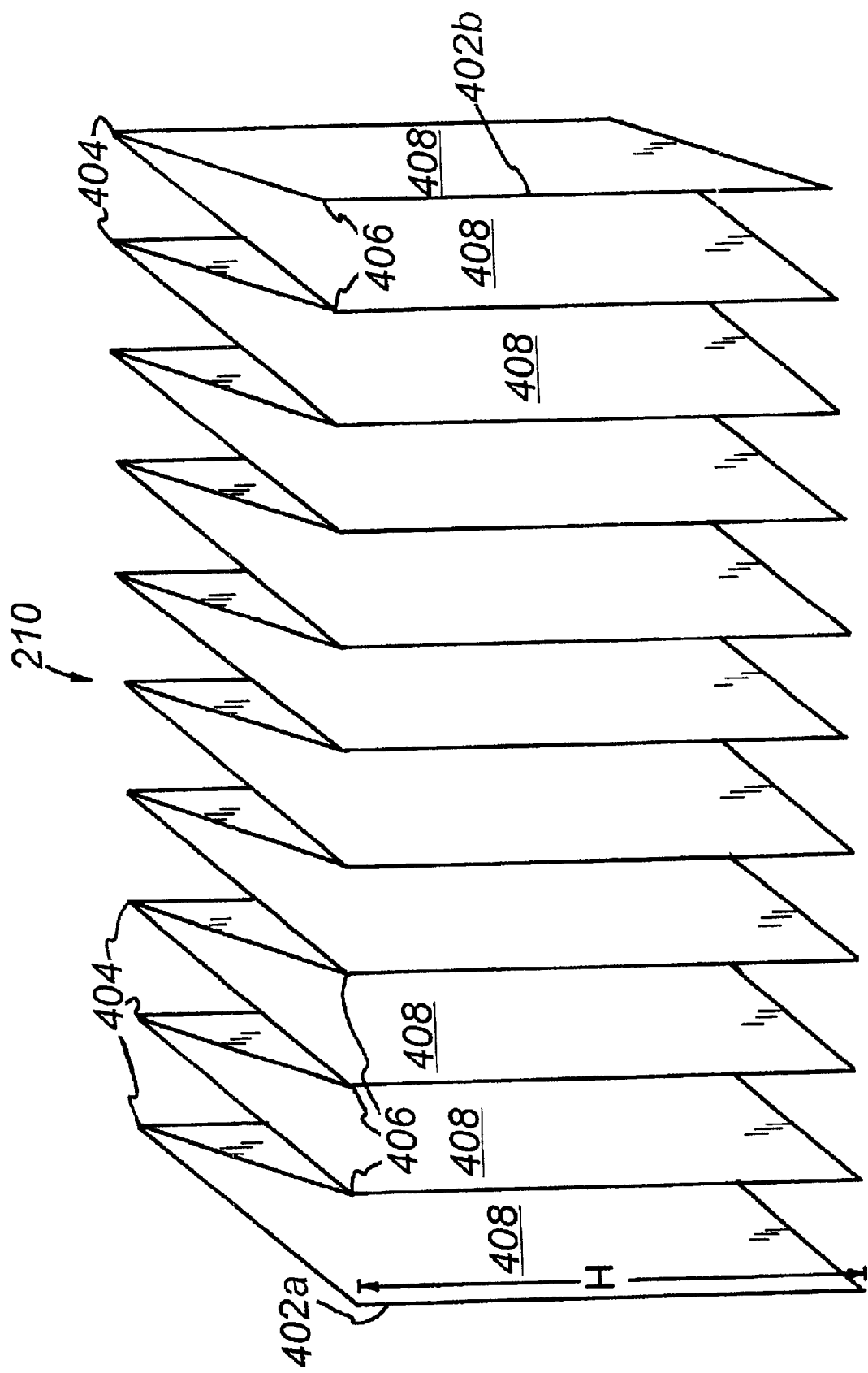
FIG. 4 is an isometric view of a heat exchanger plate in accordance with the present invention.

FIG. 4 is an isometric view of the heat exchanger plate 210. Plate 210 is preferably formed from a single, rectangular plate having two opposing ends 402a, 402b. The plate 210 is also folded back-and-forth accordion-style so as to define a plurality of alternating folds or pleats 404, 406. Between each pair of sequential folds 404, 406 is a substantially planar panel 408 of the plate 210. The two opposing ends 402a, 402b of the plate 210 are joined together so as to give plate 210 a circular form, such as a cylinder or annulus, having a center that is coaxial with the axis of rotation, as best shown in FIG. 3.

In the preferred embodiment, plate 210 is formed from 0.008 inch metal sheet stock having sufficiently high thermal conductivity, such as copper, stainless steel, etc. When folded and formed into an annular shape, plate 210 has an inside diameter of approximately 5 inches and an outside diameter of approximately 12 inches. Since the heat exchanger plate 210 of the present invention can be formed from a single rectangular piece of material, such as copper, there is little or no waste material generated during its manufacture. That is, unlike the prior art heat exchanger plates, plate 210 is not formed from punching forms out of copper stock. Accordingly, the evaporator and condenser unit 106 of the present invention can be more economically produced than prior art units.

Those skilled in the art will understand that other plate dimensions may be used depending on the desired condensation flow rate of the system 100 (FIG. 1).

The two ends 402a, 402b of plate 210 are preferably welded or braised together. The first and second end plates 212, 214, which may also be formed from copper stock, may be soldered or braised to the heat exchanger plate 210.

It should be understood that plate 210 may be formed from two or more pieces.

The liquid feed ports 230 and condensate ports 238 each have cross-sectional areas on the order of 0.005 to 0.001 square inches and are generally elliptically shaped with their major axes substantially radially aligned, although other shapes, such as circles, may be employed.

Figure 5:
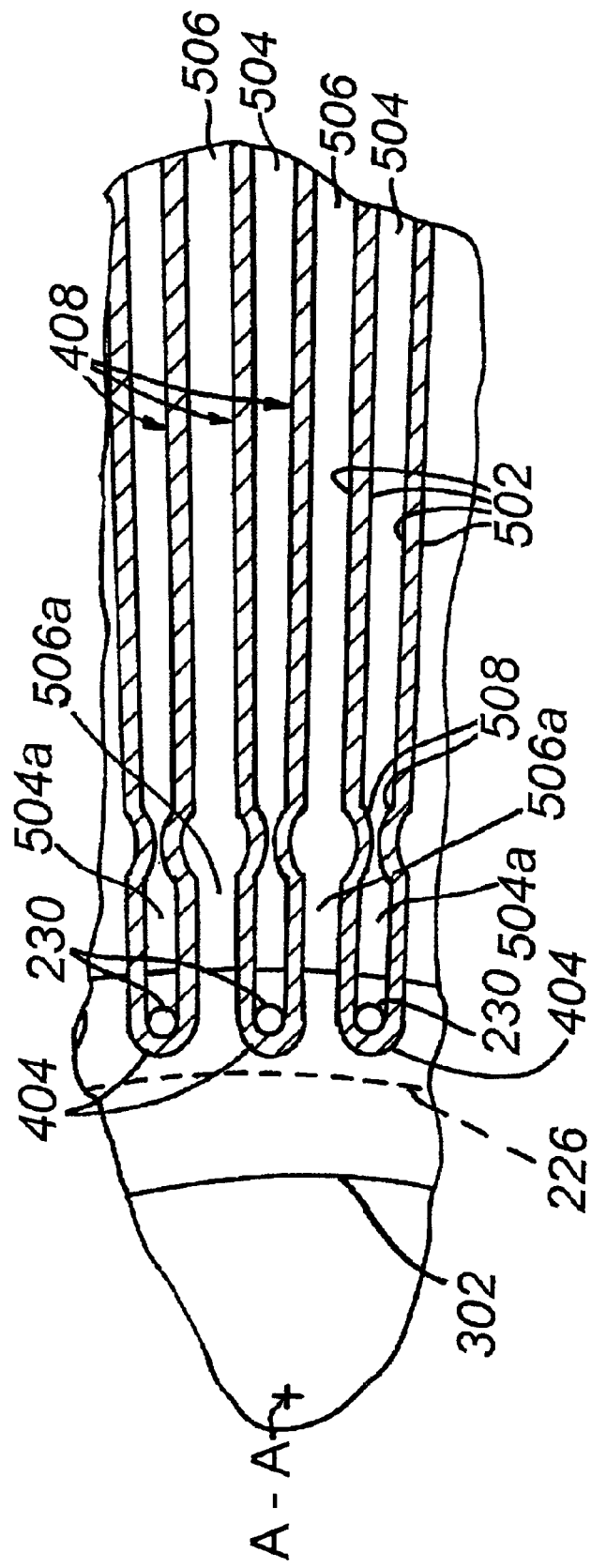
FIGS. 5 and 6 are detail views of portions of the evaporation and condensation unit of FIG. 2 along lines 5—5 and 6—6.
Figure 6:
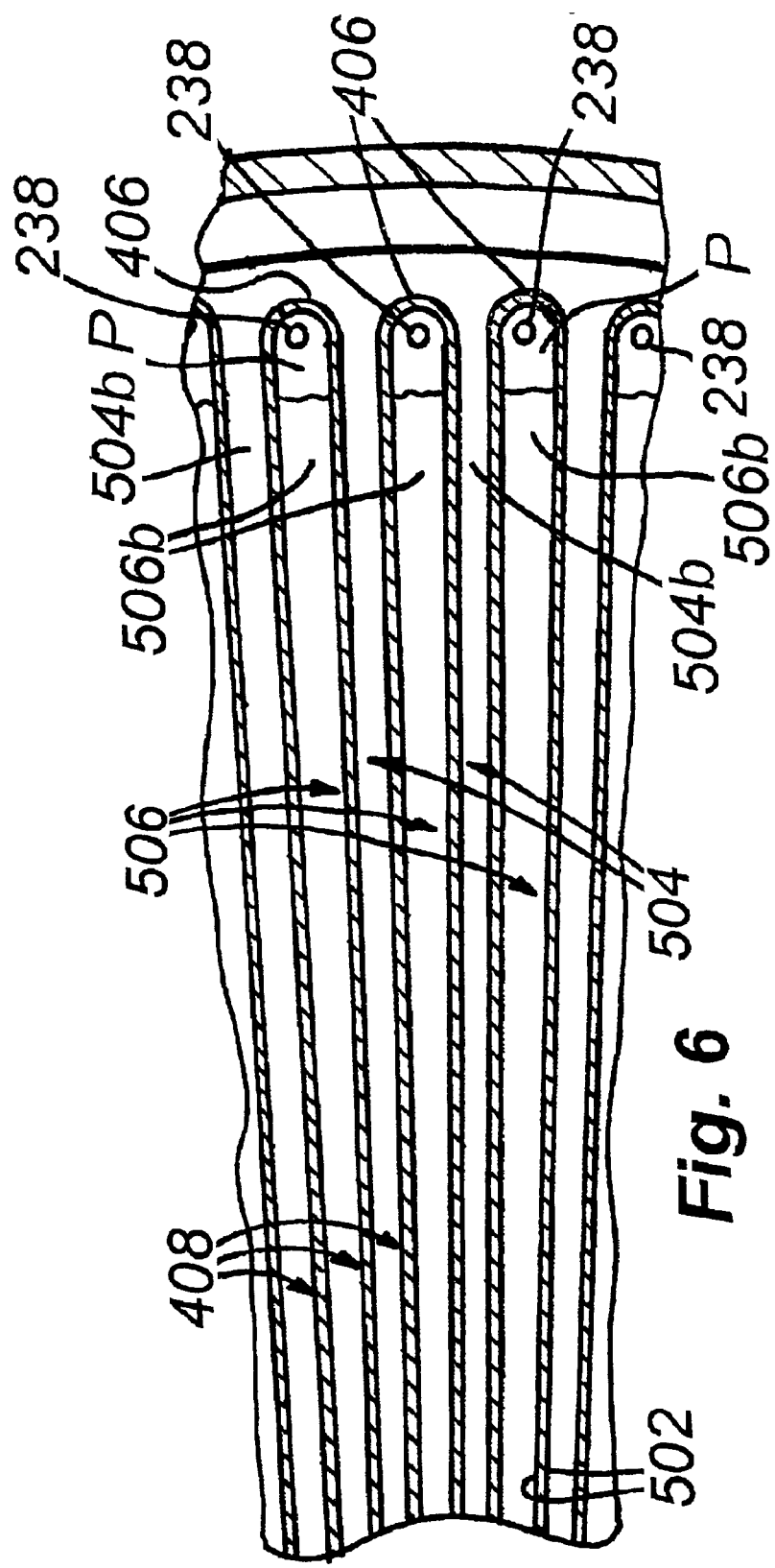

FIGS. 5 and 6 are enlarged views of the liquid introduction and condensate collection areas, respectively, of heat exchanger plate 210 along lines 5—5 and 6—6 (FIG. 2). As shown, each panel 408 of plate 210 defines two plate surfaces 502, and the oppositely facing surfaces 502 of adjacent panels 408 define spaces therebetween. These spaces, moreover, are alternately configured as evaporating chambers 504 and condensing chambers 506. By virtue of the inner folds 404 relative to axis A—A, the evaporating chambers 504 are sealed at their inner diameter ends 504a (FIG. 5), and open at their outer diameter ends 504b. The condensing chambers 506, in contrast, are open at their inner diameter ends 506a, and sealed at their outer diameter ends 506b (FIG. 6).

Each liquid port 230 (FIG. 5), moreover, which extends through the second end plate 214, opens into an inner diameter end 504a of a respective evaporating chamber 504. Each condensate port 238 (FIG. 6), which extends through the first end plate 212, opens into an outer diameter end 506b of a respective condensing chamber 506. Each panel 408 further includes a restriction element 508, disposed in the respective evaporating chamber 410. Element 508 may be a formed ridge on the panel's surface 502. Opposing restriction elements 508 define a gap through which liquid flows. The gap is preferably on the order of 0.002–0.010 inches and may be a function of the width of the corresponding evaporating chambers 504. The gap is preferably located slightly outboard of the liquid ports 230 relative to the rotational axis A—A, and extends the full height H (FIG. 4) of the plate 210. It may also taper from bottom to top (i.e., the gap may be smaller at the bottom than at the top) to yield an even flow along the plate 210.

Although the particular compressor 110 type is not critical to the present invention's operation, a compressor of the type disclosed in copending U.S. patent application Ser. No. 09/209,947, filed Dec. 11, 1998, entitled A Reciprocating Low Pressure Ratio Compressor, and hereby incorporated by reference in its entirety, is preferred. The motor 108, too, is a matter of design choice, one example being a two or four pole electrical motor having an operating speed in the range of 1500–3600 rpm. However, any source of rotary power may be employed.

In operation, motor 110 is activated, thereby rotating shaft 222, which, in turn, rotates the heat exchanger plate 210, first and second end plates 212, 214 and compressor 214 within housing 202. A conventional speed reducer, such as a belt or gear transmission (not shown), is preferably employed so that the rotational speed of these components is approximately 1000 rpm. Liquid to be distilled, such as non-potable water, passes through heat exchanger 102, where it is heated approximately to its boiling point and flows through inlet pipe 108 into the sump 224 of the evaporation and condensation unit 106. The liquid is then heated to boiling within the sump 224 by suitable means, such as an electric element (not shown). Compressor 214 is also activated, thereby drawing any vapor from the evaporated vapor space 242 of housing 202 into the inlet 218. Compressed vapor is fed to the compressed vapor space 244 through compressor outlet 220. Rotation of plate 210 causes the rotary scoop tube 228 to be driven through the sump 224. With its open end 228a disposed below the surface of the liquid in the sump 224 and open in the direction of rotation, scoop tube 228 picks up a volume of liquid and passes it to the liquid feed ring 226. Once the feed ring 226 is filled, the liquid flows through the liquid ports 230 formed in the second end plate 214 and into the evaporation chambers 504. A liquid flow path is thus established from the sump to the evaporating chambers 504.

The centrifugal force generated within the rotating plate 210 forces the liquid from the inner diameter ends 504a of the evaporating chambers 504 through the restriction elements 508, where it is converted into a thin film or sheet (as opposed to discrete streams) that flow along each of the oppositely facing plate surfaces 502. The restriction elements 508 may also meter the flow of liquid through the respective evaporating chambers 504 such that liquid is received through port 230 faster than it flows through the respective evaporating chamber 504. Accordingly, a pool of liquid may form in the inner diameter end 504a of each evaporating chamber 504.

As the liquid flows along the opposing plate surfaces 502 within each evaporating chamber 504, heat from the adjacent condensing chambers 506 causes some portion of this liquid to evaporate and form a vapor. The vapor flows radially outward and, since the evaporating chambers 504 are open at their outboard ends 504b, the vapor enters evaporated vapor space 242 of housing 202. Any remaining liquid (i.e., liquid that was not converted to vapor) is flung off of the panel surfaces 502, strikes the side wall 208 of the housing 202 and drops back down into the sump 224.

It should be understood that the rotary scoop tube 228, liquid ports 230 and restriction elements 508 are all sized, and the rotation speed of heat exchanger plate 210 is selected, such that liquid is forced up the full height H (FIG. 4) of the heat exchanger plate 210, thereby using all available surface area of the constituent panels 408 of the evaporating chambers 504. Furthermore, those skilled in the art will recognize that other means besides one or more rotating scoop tubes 228 may be employed to transport liquid from the sump 224 to the liquid ports 230. For example, a pump and rotary seal arrangement may be utilized in place of tube 228.

Operation of the compressor 214 causes the vapor formed in the evaporating chambers 504 and discharged into the evaporated vapor space 242 to be drawn into the compressor inlet 218. The vapor is then compressed raising its temperature and pressure. Compressed vapor is supplied to the compressed vapor space 244 by compressor outlet 220. From here, the compressed vapor enters the condensing chambers 506, which are open at their inner diameter ends 506a and thus in fluid communication with the compressed vapor space 244. Since the evaporating chambers 504 are sealed at their inner diameter ends 504a, due to the presence of inner folds 404, compressed vapor does not enter the evaporating chambers 504.

In the preferred embodiment, the heat exchanger 102 and compressor 216 are set to provide a pressure differential of approximately 1.0 pound per square inch (psi) and a temperature differential of approximately 3° Fahrenheit (F.) between the evaporating and condensing chambers 504, 506 during steady state operation of unit 106.

As the liquid flowing along the panel surfaces 502 in the adjacent evaporating chambers 504 is vaporizing at a lower temperature (e.g., 212° F.) than the compressed vapor (e.g., 215° F. saturation temperature), compressed vapor condenses along the opposing panel surfaces 502 within the respective condensing chambers 506. This condensate is forced to the outboard ends 506b of the condensing chambers 506 by the centrifugal acceleration generated through rotation of the plate 210. Because the outboard ends 506b of the condensing chambers 506 are sealed, due to the presence of outer folds 406, the condensate forms pools, generally designated P (FIG. 6), at the outboard ends 506b of the condensing chambers 506. As more and more vapor condenses and collects at the outboard ends 506b of the condensing chambers 506, the surfaces of these pools P rise (e.g., move toward the axis of rotation A—A).

The condensate, which is constantly seeking out a lower level (relative to axis A—A), reaches and eventually flows through the condensate ports 238 in the first end plate 212 and spills into the first condensate collection space 234a (FIG. 2). The condensate then climbs over the weir or dam 236 and enters the second collection area 234b. Here, condensate is removed by stationary scoop 240. More specifically, the build-up of condensate in the second collection space 234b will eventually reach the scoop opening 240a, at which point condensate will be forced into the scoop 240 and removed from the evaporating and condensing unit 106. By constantly removing condensate from the collection space 234, a flow pattern is established up through the condensing chambers 506, through the condensate ports 238 and into the condensate collection space 234. The weir or dam 236 is preferably sized to prevent compressed vapor in the condensing chambers 506 from flowing through the condensate ports 238 and entering the evaporation vapor space 242. That is, the presence of weir 236 causes a corresponding column of condensate to form in first space 234a This column of condensate blocks higher pressure vapor in the condensing chambers 506 from simply flowing up through condensate ports 238 and entering that portion of the housing 202 that contains lower pressure vapor generated in the evaporating chambers 504.

It should be understood that the weir 236 may be removed, and the opening 240a of scoop 240 positioned within condensate collection area 234 such that the condensate ports 238 remain full of condensate, thereby preventing the escape of compressed vapor from the condensing chambers 506.

As shown, the novel fluid flow patterns established with the present invention reduce the risk of contamination of the final condensate. In particular, condensate is preferably drawn out of the unit 106 opposite the sump 224, thereby reducing the chance that "dirty" liquid from the sump 224 will contaminate the condensate. Additionally, any leaks in the condensing chambers 506 only result in condensate entering the housing 202 and falling down into the sump 224. In particular, should a leak develop between adjacent chambers 504, 506, the pressure differential will cause condensate to enter the evaporating chamber 504 while preventing "dirty" liquid from entering the condensing chambers 506.

It should be understood that unit 106 preferably includes one or more de-gasser components (not shown) for removing air and other gases from the housing 202. It should be further understood that the panel surfaces 502 in the evaporating chamber 504 may be made hydrophilic, while the panel surfaces 502 in the condensing chambers 506 may be made hydrophobic by suitable, well-known techniques.

As described herein, each fold 404, 406 of heat exchanger plate 210 is preferably co-planar with the axis of rotation A—A. The lines defined by the folds, for example, may be parallel to the axis of rotation A—A, as shown in FIG. 3, or they may intersect the axis A—A at some imaginary point above or below the sump 224. In other words, the plate 210 may have a truncated cone (or simple cone) shape rather than a cylindrical or annular shape. The larger diameter end of the truncated cone, moreover, may be located either proximate to or away from the sump 224. Those skilled in the art will recognize that other generally circular shapes may also be employed.

The foregoing description has been directed to specific embodiments of this invention. It will be apparent, however, that other variations and modifications may be made to the described embodiments, with the attainment of some or all of their advantages. For example, the evaporation and condensation unit 106 may alternatively represent 1 effect of a multi-effect, thermally driven system. In this case, the compressor as could be eliminated. In a thermally driven system liquid in the sump may be heated to the desired temperature by sources other than heat exchanger 102, such as a stove top burner, solar energy, etc. In another embodiment, the condensing chambers 506 of unit 106 could be coupled to a steam source. This steam source may constitute waste steam from a space heating system. In addition, other liquids besides water may be distilled with the system 100 of the present invention. Therefore, it is the object of the appended claims to cover all such variations and modifications as come within the true spirit and scope of the invention.

What is claimed is:

1. An evaporator and condenser unit for use in distilling a liquid, the evaporator and condenser unit comprising:
    a housing;
    a motor for supplying rotary power within the housing;
    a compressor having a compressor inlet for receiving a vapor generated within the housing and a compressor outlet for returning compressed vapor to the housing;
    a heat exchanger plate disposed within the housing and operatively coupled to the motor for rotation about an axis, the heat exchanger plate having a plurality of folds and two opposing edges that are joined together so as to give the folded plate a generally circular shape having a center that is coaxial with the axis of rotation, the folds defining a plurality of spaced-apart panels having corresponding surfaces that define alternating evaporating and condensing chambers between opposing panel surfaces; and
    a first end plate and a second end plate disposed within the housing substantially perpendicular to the axis of rotation, the folded heat exchanger plate mounted between the first and second end plates so as to seal the evaporating chambers from the condensing chambers, wherein
    the evaporating chambers are in fluid communication with the compressor inlet so as to provide vapor thereto, the condensing chambers are in fluid communication with the compressor outlet so as to receive compressed vapor therefrom, and the evaporating and condensing chambers are sealed from each other,
    the evaporating and condensing chambers include inner and outer edges relative to the axis of rotation,
    the evaporating chambers are sealed at their inner edges by corresponding folds in the heat exchanger plate, and are open at their outer edges,
    the condensing chambers are open at their inner edges, and are sealed at their outer edges by corresponding folds in the heat exchanger plate, and
    the housing includes a lower portion defining a sump containing the liquid to be distilled, the unit further comprises a plurality of liquid feed distribution ports extending through the second end plate such that a liquid flow path exists between the sump and the evaporating chambers via the liquid feed distribution ports during rotation of the heat exchanger plate.

2. The evaporator and condenser unit of claim 1 further comprising:
    a flange mounted to an outer diameter edge of the first end plate opposite the heat exchanger plate, the flange cooperating with the first end plate to define a condensate collection space therebetween;
    a plurality of condensate ports extending through the first end plate, the condensate ports providing fluid communication between condensate chambers defined by the folded heat exchanger plate and the condensate collection space; and
    at least one stationary scoop tube extending through the housing and into the condensate collection space so as to remove condensate therefrom.

3. The evaporation and condensation unit of claim 2 further comprising a liquid distribution ring mounted to the second end plate opposite the heat exchanger plate and enclosing the liquid feed distribution ports, wherein the at least one rotary scoop tube is mounted to the liquid distribution ring and delivers liquid from the sump to the ring during rotation of the heat exchanger plate.

4. The evaporator and condenser unit of claim 2 further comprising an annular weir mounted to the flange and extending into the condensate collection space, the weir configured to generate a column of condensate blocking the condensate ports in the first end plate.

5. The evaporation and condensation unit of claim 1 further comprising a restriction element disposed in the evaporating chambers for generating a thin-film liquid flow on the panel surfaces of the evaporating chambers.

6. The evaporator and condenser unit of claim 5 wherein the restriction element is formed by opposing ridges in the heat exchanger plate.

7. The evaporator and condenser unit of claim 5 wherein the heat exchanger plate has a length between the first and second end plates, and the restriction elements extends the length of the heat exchanger plate.

8. The evaporator and condenser unit of claim 7 wherein
each restriction element defines a corresponding gap in the respective evaporation chamber through which the liquid flows, and
the gap is on the order of 0.002 to 0.010 inches.

9. The evaporation and condensation unit of claim 5 further wherein each restriction element defines a corresponding gap in the respective evaporating chamber through which the liquid flows.

10. The evaporation and condensation unit of claim 9 further wherein:
the folded heat exchanger plate defines a central receiving space;
the compressor is mounted to the second end plate within the central receiving space defined by the folded heat exchanger plate;
the second end plate includes an aperture; and
the compressor inlet extends through the aperture in the second end plate.

11. The evaporator and condenser unit of claim 9 wherein the gap is on the order of 0.002 to 0.010 inches.

12. The evaporator and condenser unit of claim 1 wherein the folds of the heat exchanger plate are co-planar with the axis of rotation.

13. The evaporator and condenser unit of claim 1 wherein the compressor is disposed at the center of the heat exchanger plate between the first and second end plates, and rotates therewith.

14. The evaporator and condenser unit of claim 13 further comprising a stationary shaft coupled to the compressor.

15. The evaporator and condenser unit of claim 1 wherein a liquid feed distribution port is located at the inner edge of each evaporating chamber.

16. An evaporator and condenser unit for use in distilling a liquid, the evaporator and condenser unit comprising:
a housing;
a motor for supplying rotary power within the housing;
a compressor having a compressor inlet for receiving a vapor generated within the housing and a compressor outlet for returning compressed vapor to the housing;
a heat exchanger plate disposed within the housing and operatively coupled to the motor for rotation about an axis, the heat exchanger plate having a plurality of folds and two opposing edges that are joined together so as to give the folded plate a generally circular shape having a center that is coaxial with the axis of rotation, the folds defining a plurality of spaced-apart panels having corresponding surfaces that define alternating evaporating and condensing chambers between opposing panel surfaces; and
a first end plate and a second end plate disposed within the housing substantially perpendicular to the axis of rotation, the folded heat exchanger plate mounted between the first and second end plates so as to seal the evaporating chambers from the condensing chambers, wherein
the evaporating chambers are in fluid communication with the compressor inlet so as to provide vapor thereto, the condensing chambers are in fluid communication with the compressor outlet so as to receive compressed vapor therefrom, and the evaporating and condensing chambers are sealed from each other,
the evaporating and condensing chambers include inner and outer edges relative to the axis of rotation,
the evaporating chambers are sealed at their inner edges by corresponding folds in the heat exchanger plate, and are open at their outer edges,
the condensing chambers are open at their inner edges, and are sealed at their outer edges by corresponding folds in the heat exchanger plate, and
the housing includes a lower portion defining a sump containing the liquid to be distilled, the unit further comprising:
at least one rotary scoop tube coupled to the second end plate and extending into the sump; and
a plurality of liquid feed distribution ports extending through the second end plate, the at least one rotary scoop tube and the liquid feed distribution ports cooperating to provide a liquid flow path between the sump and the evaporating chambers during rotation of the heat exchanger plate.

17. The evaporator and condenser unit of claim 16 wherein the compressor is disposed at the center of the heat exchanger plate between the first and second end plates, and rotates therewith.

18. The evaporator and condenser unit of claim 17 further comprising a stationary shaft coupled to the compressor.

19. The evaporator and condenser unit of claim 16 wherein a liquid feed distribution port is located at the inner edge of each evaporating chamber.

20. An evaporator and condenser unit for use in a distiller having a sump containing a supply of compressed vapor, a liquid to be distilled, and source of rotary power, the evaporator and condenser unit comprising:
a heat exchanger plate operatively coupled to the source of rotary power for rotating the heat exchanger plate about an axis, the heat exchanger plate having a plurality of folds and two opposing edges that are joined together so as to give the folded plate a generally circular shape having a center that is coaxial with the axis of rotation, the folds defining a plurality of spaced-apart panels having corresponding surfaces that define alternating evaporating and condensing chambers between opposing panel surfaces; and
a first end plate and a second end plate arranged substantially perpendicular to the axis of rotation, the folded heat exchanger plate mounted between the first and second end plates and cooperating with the heat exchanger plate so as to seal the evaporating chambers from the condensing chambers, wherein
the evaporating chambers are in fluid communication with the liquid to be distilled, the condensing chambers are in fluid communication with the supply of compressed vapor, and the evaporating and condensing chambers are sealed from each other,
the evaporating and condensing chambers include inner and outer edges relative to the axis of rotation,
the evaporating chambers are sealed at their inner edges by corresponding folds in the heat exchanger plate, and are open at their outer edges,
the condensing chambers are open at their inner edges, and are sealed at their outer edges by corresponding folds in the heat exchanger plate, and
the evaporator and condenser unit further comprises a plurality of liquid feed distribution ports extending through the second end plate such that a liquid flow path exists between the sump and the evaporating chambers via the liquid feed distribution ports during rotation of the heat exchanger plate.

21. The evaporator and condenser unit of claim 20 wherein the distiller further includes a sump containing the liquid to be distilled, the heat exchanger further comprising:
- at least one rotary scoop tube coupled to the second end plate and extending into the sump; and
- a plurality of liquid feed distribution ports extending through the second end plate, the at least one rotary scoop tube and the liquid feed distribution ports cooperating to provide a liquid flow path between the sump and the evaporating chambers during rotation of the heat exchanger plate.

22. The evaporator and condenser unit of claim 20 further comprising:
- a flange mounted to an outer diameter edge of the first end plate opposite the heat exchanger plate, the flange cooperating with the first end plate to define a condensate collection space therebetween;
- a plurality of condensate ports extending through the first end plate, the condensate ports providing fluid communication between condensate chambers defined by the folded heat exchanger plate and the condensate collection space; and
- at least one stationary scoop tube extending into the condensate collection space so as to remove condensate therefrom.

23. The evaporator and condenser unit of claim 22 further comprising an annular weir mounted to the flange and extending into the condensate collection space, the weir configured to generate a column of condensate blocking the condensate ports in the first end plate.

24. The evaporator and condenser unit of claim 20 further comprising a liquid distribution ring mounted to the second end plate opposite the heat exchanger plate and enclosing the liquid feed distribution ports, wherein the at least one rotary scoop tube is mounted to the liquid distribution ring and delivers liquid from the sump to the ring during rotation of the heat exchanger plate.

25. The evaporator and condenser unit of claim 24 further comprising a restriction element disposed in the evaporating chambers for generating a thin-film liquid flow on the panel surfaces of the evaporating chambers.

26. The evaporator and condenser unit of claim 25 further wherein each restriction element defines a corresponding gap in the respective evaporating chamber through which the liquid flows.

27. The evaporator and condenser unit of claim 20 wherein the folds of the heat exchanger plate are co-planar with the axis of rotation.

* * * * *